March 7, 1939. A. KOLIN 2,149,847

APPARATUS FOR MEASURING FLUID FLOW

Filed July 15, 1937

INVENTOR.
ALEXANDER KOLIN
BY McConkey Dawson & Booth
ATTORNEYS.

Patented Mar. 7, 1939

2,149,847

UNITED STATES PATENT OFFICE 2,149,847

APPARATUS FOR MEASURING FLUID FLOW

Alexander Kolin, Chicago, Ill.

Application July 15, 1937, Serial No. 153,737

4 Claims. (Cl. 73—194)

This invention relates to apparatus for measuring fluid flow, and more particularly to an electromagnetic apparatus for measuring fluid flow.

One of the objects of the invention is to provide a measuring apparatus in which measurements are effected electrically so that there is no lag due to inertia or friction of moving parts.

Another object of the invention is to provide a measuring apparatus in which measurements are effected by inducing a voltage in a fluid flowing through a magnetic field. This apparatus may be utilized to measure the rate of fluid flow in case the field strength is known or varying according to some known function.

Other objects, advantages and desirable features of the invention will be apparent from the following description and by reference to the accompanying drawing, in which.

The apparatus may be used to measure the rate of flow of fluid through a conduit and in this use has the advantages of measuring the flow instantaneously and of averaging automatically the varying rates of flow throughout the entire cross sectional area of the conduit. Preferably the field is supplied from outside of the conduit which then is composed of non-magnetic material such as brass, glass, aluminum or the like. If the conduit is of iron or other magnetic material, suitable magnet poles may be placed inside thereof to create a magnetic field across the flow passage. Any fluid which is a conductor of electricity may be measured or any fluid which is normally a non-conductor but which can be ionized may be measured in its ionized state. I have found that results can be obtained by this apparatus over a very wide range of conductivity of the fluid or of degree of ionization thereof.

In measuring the flow of fluid through a conduit according to the invention, a magnetic field may be created across the conduit at an angle to the direction of flow therethrough. It is preferred to have the field at a right angle to the flow, but any other angle can be used so long as the flowing fluid intersects the field. This may be done by placing the opposite poles of any suitable magnet on opposite sides of the conduit. As the flowing fluid intersects the magnetic field a potential gradiant is created therein and contacts may be inserted in the conduit at points of different potential. Preferably the contacts are inserted in opposite sides of the conduit in a line at an angle to both the magnetic field and to the direction of fluid flow so that voltage induced in the fluid by its flow through the magnetic field will be impressed on the contacts. In this case also a right angle is preferable, although other angles can be used. In the case of a porous conduit such as clay, the contacts may be placed outside of the walls in contact therewith, sufficient conduction being obtained through the walls. Where alternating or pulsating current is used with a dielectric conduit the contacts may be placed outside of the conduit walls, the induced alternating current being conducted through the dielectric walls and impressed upon the contacts in a manner similar to that of a condenser.

In case the magnetic field is constant, as is produced by a permanent magnet or an electromagnet energized by direct current, a voltage is induced according to the formula:

$$E = Hlv10^{-8}$$

where

E is the induced voltage,
H is the strength of the field,
$l$ is the width of the flowing stream intercepted by the flux,
$v$ is the velocity of flow.

Where an electromagnet energized by alternating current is used $$H = f(t)$$

where $t$ is the time. Therefore $$E = f(t)lv10^{-8} + A$$

where A is the voltage induced in the fluid when it is not flowing.

By applying the known or measured values to the appropriate one of these formulas, the flow can readily be calculated.

Figure 1:
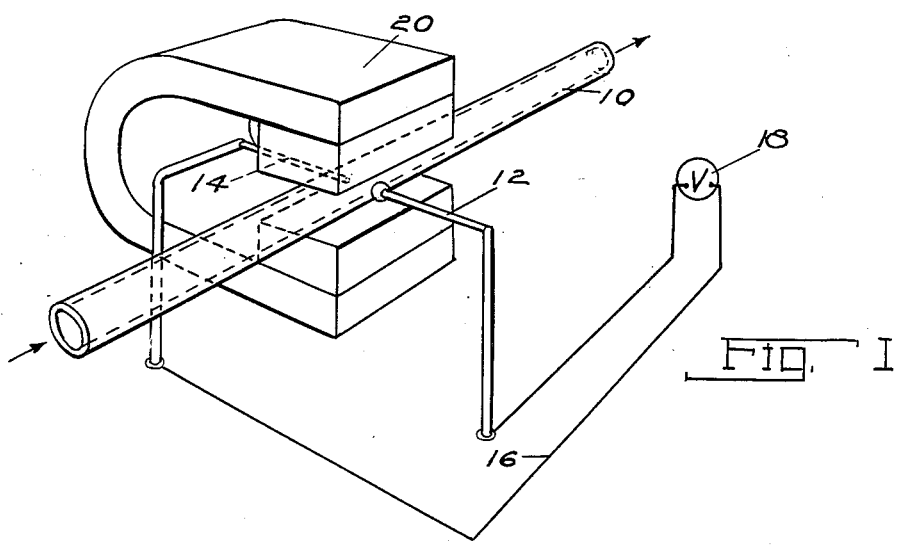
Figure 1 is a diagrammatic perspective view of one apparatus embodying the invention.

A simple form of apparatus for carrying out the invention is illustrated in Figure 1 which shows a conduit 10 of non-magnetic material having contacts or terminals 12 and 14 extending through its sides and connected in an electric circuit 16 including a millivoltmeter or galvanometer 18. If the conduit 10 is formed of non-conducting material such as glass, the contacts 12 and 14 may be sealed in suitable openings in its sides, as seen best in Figure 2, but if it is formed of conducting material such as brass, the contacts 12 and 14 must be insulated from the conduit wall.

For use in measuring the flow through the conduit 10, a magnet 20 is arranged with its opposite poles diametrically across the conduit with the poles in a line at right angles to the contacts 12 and 14. As fluid flows through the conduit, a voltage will be induced therein proportional to the field strength and the rate of flow and will be impressed on the millivoltmeter 18 through the contacts 12 and 14 and the circuit 16. If desired the millivoltmeter may be calibrated to read directly in terms of rate of flow. If a constant field is used, the contacts preferably consist of non-polarizable material.

Figure 2:
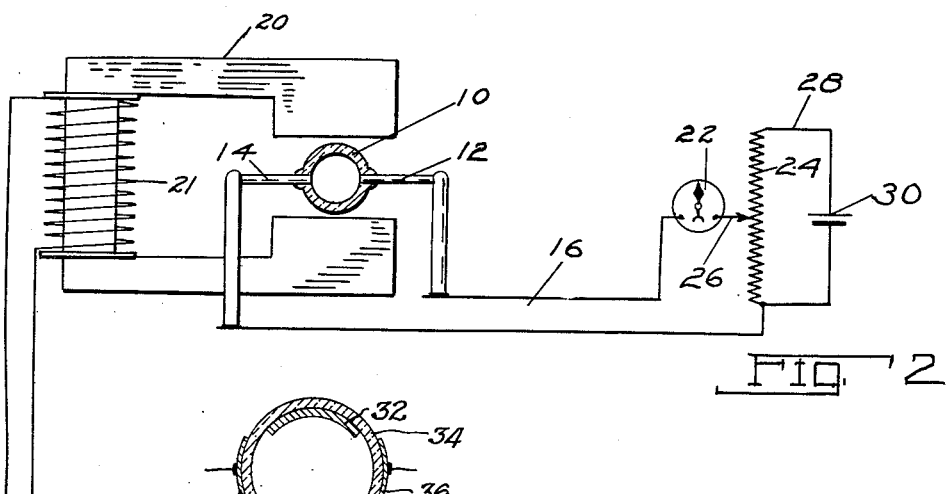
Figure 2 is a diagrammatic view of a modified form of apparatus.

Figure 2 illustrates a modified apparatus in which no current is allowed to flow in the circuit and in which an accurate measurement of the induced voltage can be obtained. In this figure the magnet 20 is shown as an electro-magnet having a winding 21 energized by a suitable source of direct current and the circuit 16 includes a galvanometer 22 and a portion of a variable resistance 24 having a movable wiper 26 which is connected in the circuit 16. A second circuit 28 including a source of voltage such as a battery 30 is connected across the resistance 24 in such a way as to impose a counter voltage on the circuit 16. By adjusting the wiper 26, the induced voltage and the counter voltage may be exactly balanced so that the galvanometer will register zero, the value of the induced voltage being indicated by the position of the wiper. The winding 21 may be energized by direct current to produce a constant field or by alternating or pulsating current to produce an alternating or pulsating field.

Figure 3:
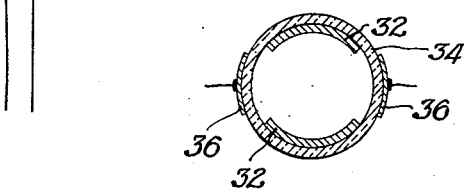
Figure 3 is a partial cross sectional view illustrating another modified form of apparatus.

In the form illustrated in Figure 3, suitable magnet poles 32 are mounted inside of a conduit 34 so that the fluid must flow between them and contacts 36 are arranged on the outside of the conduit. In the case of a porous conduit there will be sufficient seepage through the walls to cause the walls to act as a conductor forming an electrical connection between the fluid and the contacts 36 to produce the same effect as when a conduit is employed formed of material which is a relatively poor conductor. When alternating current is used to energize the poles 32 the contact plates may act in the manner of a condenser.

It will be understood that the invention can be used for different purposes or carried out in different ways by other forms of apparatus than described herein, and it is not intended to limit the scope of the invention to the specific arrangements described or otherwise than by the terms of the appended claims.

What is claimed is:

1. Apparatus for measuring fluid flow comprising a conduit through which the fluid to be measured flows, means disposed adjacent the conduit for creating a homogeneous magnetic field across the entire sectional area of the conduit, electrodes associated with the conduit and communicating electrically with the fluid, and an indicator in circuit with said electrodes.

2. Apparatus for measuring fluid flow comprising a conduit through which the fluid to be measured flows, magnetic means including opposite magnet poles on opposite sides of the conduit and a coil for energizing said poles to create a homogeneous magnetic field across the entire sectional area of the conduit between the poles, electrodes connected to the sides of the conduit in a line substantially at right angles to the magnetic field and the direction of fluid flow and communicating electrically with the fluid, and an indicator in circuit with the electrodes.

3. Apparatus for measuring fluid flow comprising a conduit through which the fluid to be measured flows, means disposed adjacent the conduit for creating a homogeneous magnetic field across the entire sectional area of the conduit, said conduit being formed of dielectric material, electrodes mounted outside of the conduit and separated from the fluid by the conduit walls to form a condenser, and an indicator in circuit with said electrodes.

4. Apparatus for measuring fluid flow comprising a conduit through which the fluid to be measured flows, magnet poles mounted in the conduit at diametrically opposite sides thereof for creating a homogeneous magnetic field across the entire sectional area of the flowing fluid, electrodes associated with the conduit and communicating electrically with the fluid, and an indicator in circuit with said electrodes.

ALEXANDER KOLIN.